(12) United States Patent
Cao et al.

(10) Patent No.: US 10,930,916 B2
(45) Date of Patent: Feb. 23, 2021

(54) COMPOSITE END PLATE FOR BATTERY MODULE AND BATTERY MODULE

(71) Applicant: Contemporary Amperex Technology Co., Limited, Ningde (CN)

(72) Inventors: Gen Cao, Ningde (CN); Weihua Mo, Ningde (CN); Jihua Yao, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 197 days.

(21) Appl. No.: 16/225,972

(22) Filed: Dec. 19, 2018

(65) Prior Publication Data
US 2019/0207195 A1 Jul. 4, 2019

(30) Foreign Application Priority Data
Dec. 29, 2017 (CN) .......................... 201711477236.4

(51) Int. Cl.
*H01M 2/22* (2006.01)
*H01M 2/10* (2006.01)
*H01M 10/04* (2006.01)
*H01M 2/04* (2006.01)

(52) U.S. Cl.
CPC ........... *H01M 2/22* (2013.01); *H01M 2/0469* (2013.01); *H01M 2/1016* (2013.01); *H01M 2/1061* (2013.01); *H01M 2/1077* (2013.01); *H01M 10/0481* (2013.01)

(58) Field of Classification Search
CPC .. H01M 2/22; H01M 2/1061; H01M 10/0481; H01M 2/1077; H01M 2/0469; H01M 2/1016; H01M 2220/20
USPC ....................................................... 429/160
See application file for complete search history.

(56) References Cited

U.S. PATENT DOCUMENTS

2013/0183571 A1* 7/2013 Miyazaki .......... H01M 10/6557
429/156
2017/0352850 A1* 12/2017 Nagane ............... H01M 2/1077

FOREIGN PATENT DOCUMENTS

CN 106654103 A 5/2017
CN 206727139 U 12/2017

OTHER PUBLICATIONS

The extended European Search Report for European Application No. 18215084.7, dated Apr. 25, 2019, 10 pages.

\* cited by examiner

*Primary Examiner* — Gary D Harris
(74) *Attorney, Agent, or Firm* — Law Offices of Liaoteng Wang

(57) ABSTRACT

The present disclosure relates to a composite end plate and a battery module. The composite end plate comprises a rigid substrate, which has a first surface and a second surface that are opposite in a thickness direction of the rigid substrate, the first surface is disposed facing batteries; a rigid connecting plate, which comprises a connecting portion and a hook portion that is bent toward the connecting portion, the hook portion is embedded in the rigid substrate to connect the rigid connecting plate to the rigid substrate, the connecting portion is located on the second surface for connecting and fixing with an external structural member, and a material of the rigid connecting plate is different from that of the rigid substrate. The composite end plate according to the present disclosure can improve the structural strength of the battery module.

9 Claims, 6 Drawing Sheets

COMPOSITE END PLATE FOR BATTERY MODULE AND BATTERY MODULE

CROSS-REFERENCE TO RELATED APPLICATION

This application is based on and claims priority to Chinese Patent Application No. 201711477236.4 filed on Dec. 29, 2017, which is incorporated herein by reference in its entirety.

TECHNICAL FIELD

The present disclosure relates to the technical field of power battery, and in particular, to a composite end plate and a battery module.

BACKGROUND

With development of technology, power batteries are increasingly and widely applied in production or life. The power battery is also called a secondary battery and is a rechargeable battery. Low-capacity power battery may be used in small electric vehicles, and high-capacity power battery may be used in large electric vehicles such as hybrid or electric vehicles. When power batteries are used in groups, a bus-bar is required to connect each power battery in series or in parallel. Generally, the bus-bar is soldered to the positive and negative electrodes of the power battery. Each power battery includes a plurality of battery modules. Each battery module includes a plurality of batteries and an end plate and a side plate for fixing the plurality of batteries. The end plate and the side plate are disposed around all the batteries. In the prior art, the end plate has an integral structure. The end plate and the side plate are fixedly mounted by welding. As the capacity of the battery module increases continuously, the battery will inflate itself in some cases, thereby applying an inflation force to the end plate and the side plate. This causes the end plate and the side plate to be easily deformed and displaced, thereby causing failure of the welding bead between the end plate and the side plate. Therefore, there is the problem of low structural strength in the conventional battery module.

SUMMARY

Embodiments of the present disclosure provide a composite end plate and a battery module. The composite end plate can improve the structural strength of the battery module.

In one aspect, an embodiment of the present disclosure provides a composite end plate for a battery module, comprising a rigid substrate, which has a first surface and a second surface that are opposite in a thickness direction of the rigid substrate, the first surface is disposed facing batteries; and a rigid connecting plate, which comprises a connecting portion and a hook portion that is bent toward the connecting portion, the hook portion is embedded in the rigid substrate to connect the rigid connecting plate to the rigid substrate, the connecting portion is located on the second surface for connecting and fixing with an external structural member, and a material of the rigid connecting plate is different from that of the rigid substrate.

According to an aspect of an embodiment of the present disclosure, the rigid substrate and the rigid connecting plate are both made of metal; or the rigid substrate is made of non-metal, and the rigid connecting plate is made of metal.

According to an aspect of an embodiment of the present disclosure, the connecting portion is fixedly connected to the rigid substrate by a fastener, a through hole extending in the thickness direction is provided in the rigid substrate, a connecting hole corresponding to the through hole is provided in the connecting portion, and the fastener passes through the connecting hole and the through hole to connect and fix the connecting portion with the rigid substrate.

According to an aspect of an embodiment of the present disclosure, the number of the rigid connecting plate is two, and the two rigid connecting plates are spaced apart in a length direction of the rigid substrate.

According to an aspect of an embodiment of the present disclosure, the hook portions of the two rigid connecting plates are oppositely disposed, and the two rigid connecting plates are symmetrically disposed with respect to a central axis of the rigid substrate.

According to an aspect of an embodiment of the present disclosure, the rigid substrate includes a positioning groove which is shaped to match the hook portion, the positioning groove extends in a height direction of the rigid substrate, and the hook portion can be inserted into the positioning groove along the height direction.

According to an aspect of an embodiment of the present disclosure, the rigid substrate further comprises a receiving groove which is shaped to match the connecting portion, the receiving groove is recessed from the second surface toward the first surface and is communicated with the positioning groove, the connecting portion is recessed into the receiving groove, and a surface of the connecting portion facing away from the rigid substrate is flush with the second surface.

According to an aspect of an embodiment of the present disclosure, the hook portion includes a first extending segment and a second extending segment that are disposed to intersect with each other, and the hook portion is connected to the connecting portion by the first extending segment, and the second extending segment and the connecting portion are located on the same side of the first extending segment.

According to an aspect of an embodiment of the present disclosure, the connecting portion includes a first straight segment, an intermediate transition segment, and a second straight segment that are successively arranged, the intermediate transition segment is disposed to intersect the first straight segment, the second straight segment is disposed in parallel with the first straight segment and is connected to the intermediate transition segment, the connecting portion is connected to the hook portion by the first straight segment, and the connecting portion is fixedly connected to the rigid substrate by the second straight segment.

The composite end plate according to the embodiment of the present disclosure comprises the rigid substrate and the rigid connecting plate which are made of different materials. When the composite end plate is applied to a battery module, the rigid connecting plate is used for connecting and fixing with the side plate. The rigid connecting plate and the side plate may be of the same material and can be connected to each other by welding. Thus, the welding bead between the rigid connecting plate and the side plate has strong strength and improved tensile stress resistance, such that the composite end plate can withstand larger inflation deformation force of the batteries. Therefore, the overall structure of the battery module can be improved. In addition, the material of the rigid substrate may be arbitrarily selected according to actual production requirements, which improves the adaptability of rigid substrate.

In another aspect, an embodiment of the present disclosure provides a battery module, comprising a plurality of batteries, which are arranged side by side; and a fixing frame, which is disposed around a periphery of all the batteries, the fixing frame comprises two composite end plates according to any one of claims 1 to 9 and two side plates, the composite end plates and the side plates are alternately disposed around the plurality of the batteries, and the side plates are made of the same material as the rigid connecting plates and are fixedly connected to the connecting portions.

BRIEF DESCRIPTION OF THE DRAWINGS

Features, advantages, and technical effects of the exemplary embodiments of the present disclosure will be described below with reference to the drawings.

Figure 1:
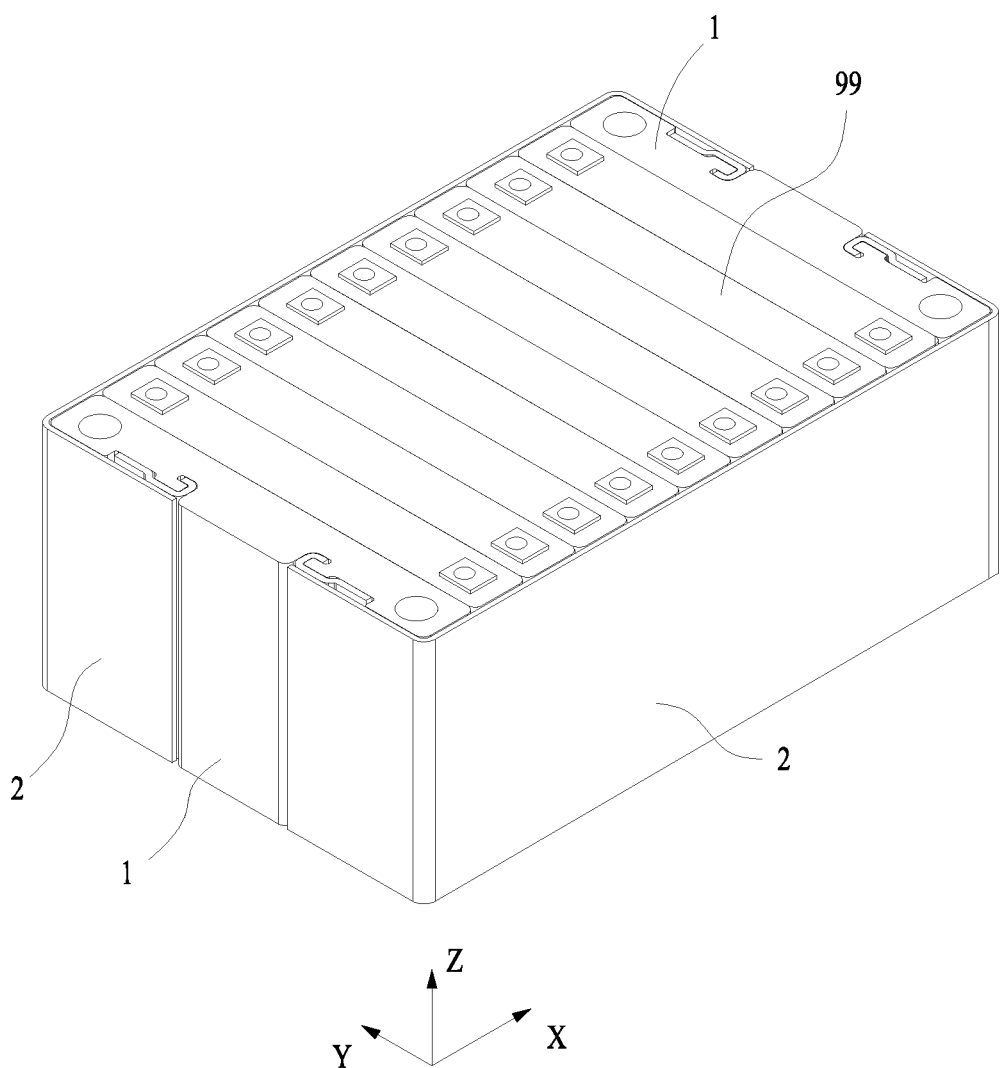
FIG. 1 is a schematic view showing the structure of a battery module having a composite end plate according to an embodiment of the present invention.

In the drawing, the figures are not drawn to scale.

DETAILED DESCRIPTION

Embodiments of the present disclosure will be further described in detail below in conjunction with the drawings and embodiments. The detailed description of the embodiments and the accompanying drawings are intended to illustrate the principle of the present disclosure, but are not intended to limit the scope of the present disclosure. In other words, the present disclosure is not limited to the described embodiments.

In the description of the present disclosure, it should be noted that, unless otherwise stated, the meaning of "plurality" is two or more; the orientation or positional relationship indicated by the terms "upper", "lower" "left", "right", "inside", "outside" and like is merely for describing the present disclosure and simplifying the description and does not indicate or intend that the involved device or element must have the specific orientation or must be configured or operated in a specific orientation, and therefore, should not to be construed as a limitation to the present disclosure. Moreover, the terms "first", "second", and the like are only for the purpose of description, and should not to be construed as indicating or implying relative importance.

In the description of the present disclosure, it should be noted that the terms "mount", "connect with", and "connect to" are to be understood broadly, for example, they may be fixed connection or detachable connection or integral connection; mechanical connection or electrical connection; or direct connection or indirect connection through an intermediate medium. The specific meaning of the above terms in the present disclosure may be understood by the skilled in the art based on the specific situation.

In order to understand the present disclosure better, a composite end plate 1 according to an embodiment of the present disclosure will be described in detail below with reference to FIGS. 1 to 6.

Figure 2:
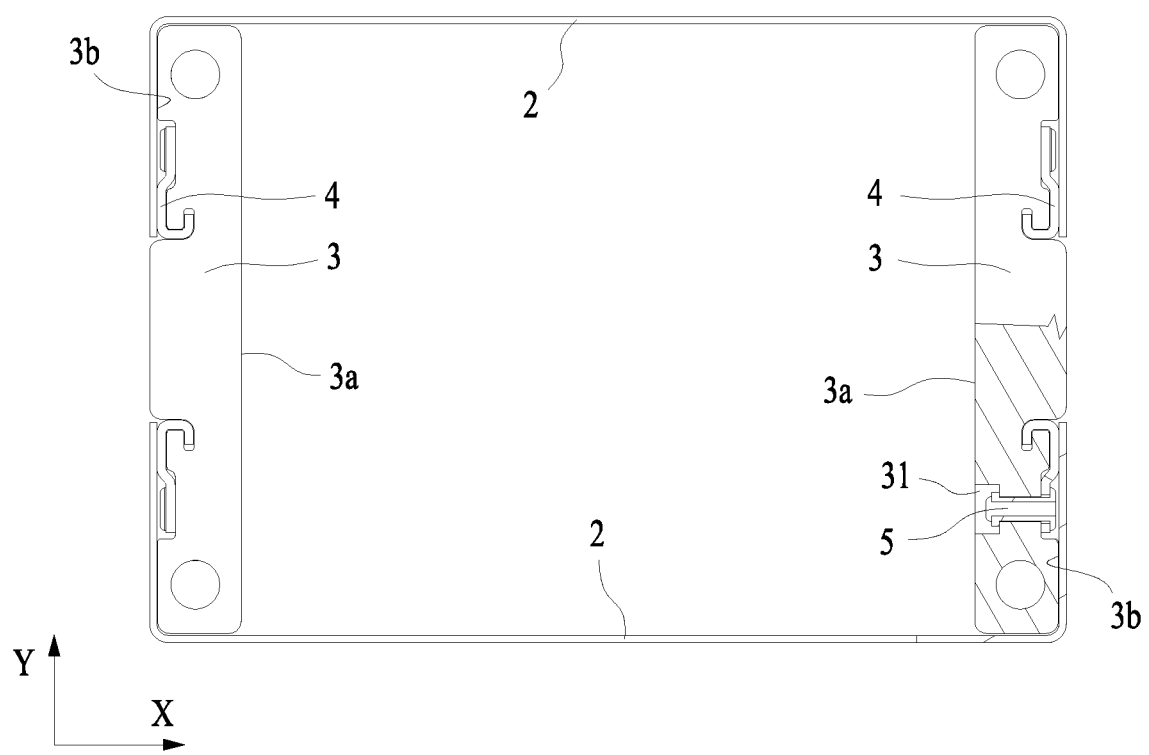
FIG. 2 is a schematic view showing a connection structure of a composite end plate and a side plate according to an embodiment of the present invention.
Figure 3:
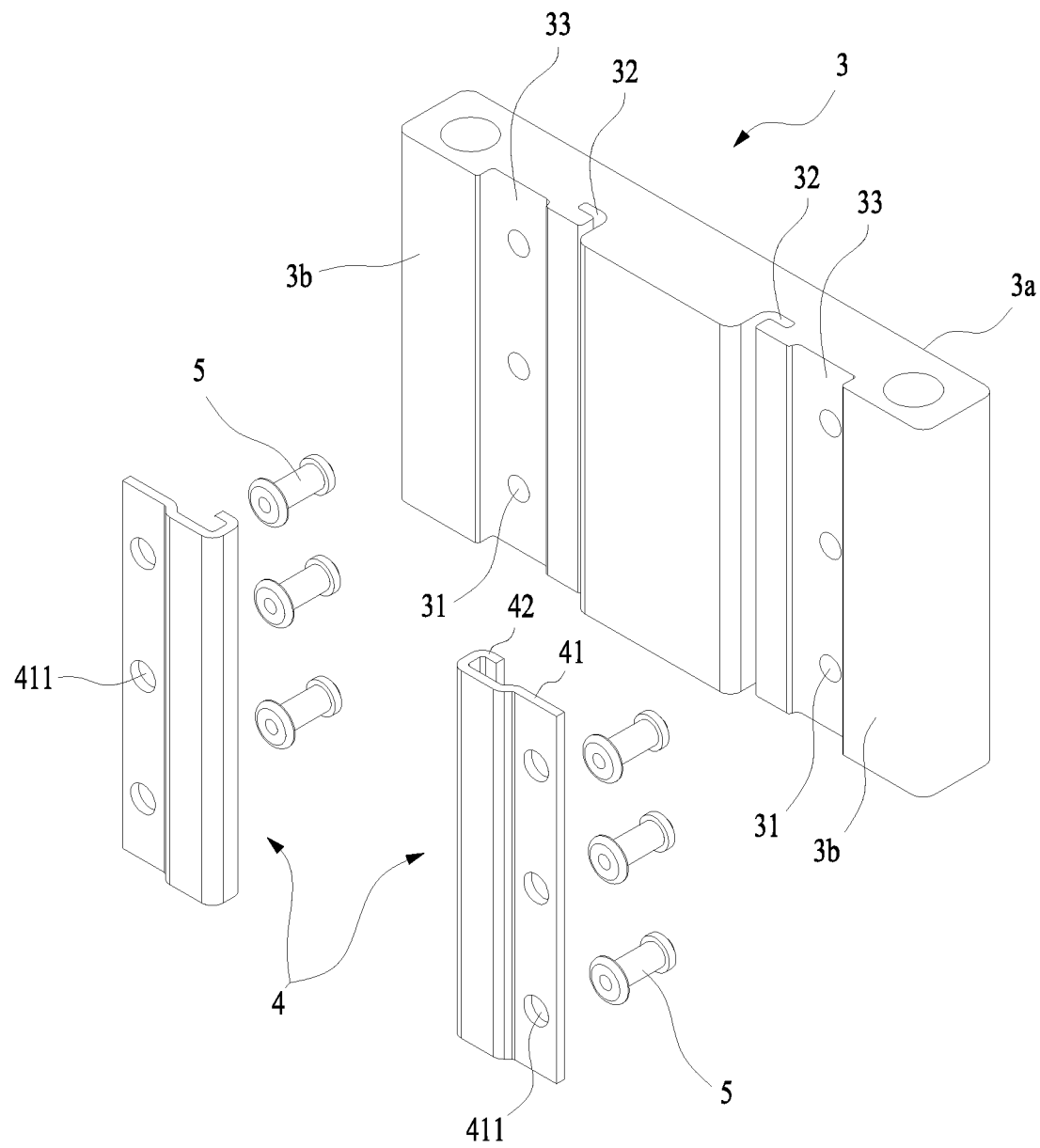
FIG. 3 is a schematic exploded view showing a composite end plate according to an embodiment of the present invention.
Figure 4:
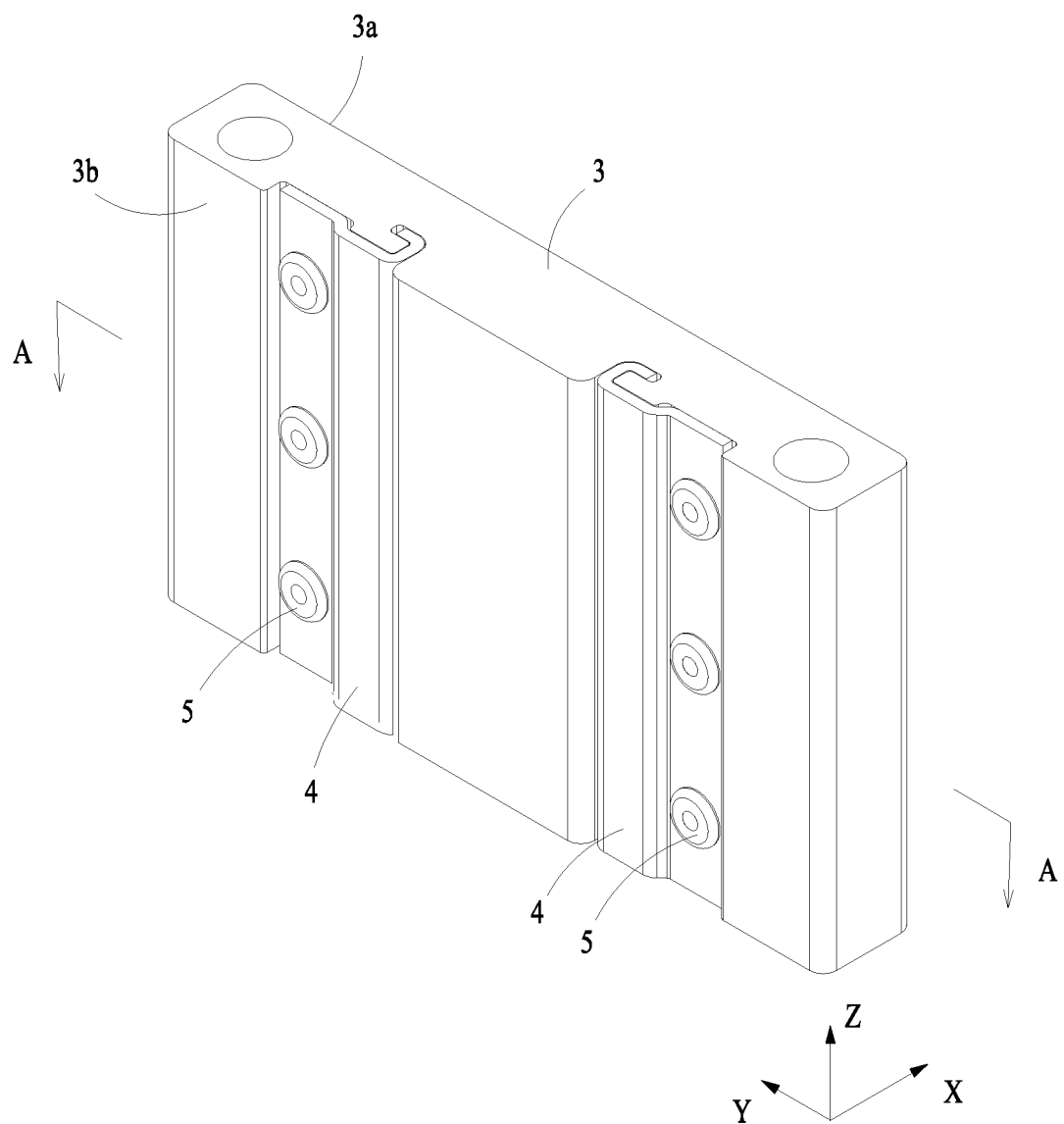
FIG. 4 is a schematic view showing the overall structure of a composite end plate according to an embodiment of the present invention.
Figure 5:
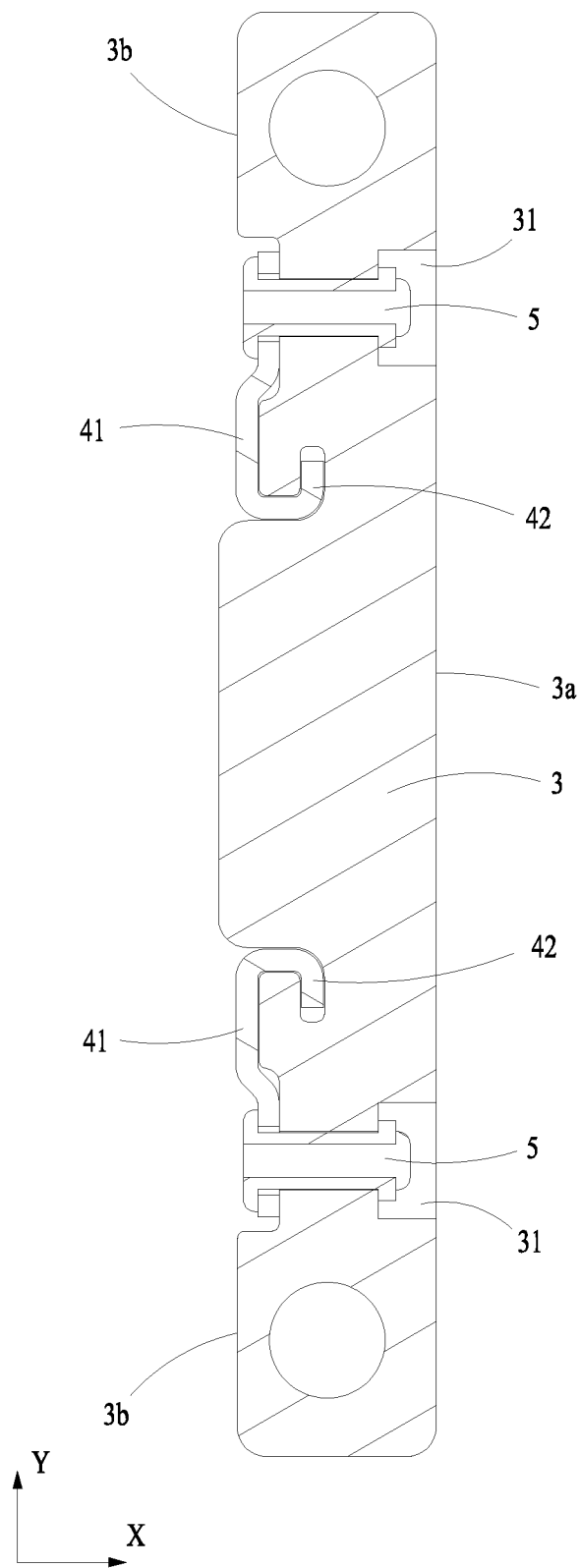
FIG. 5 is a schematic cross-sectional view taken along line A-A of FIG. 4.
Figure 6:
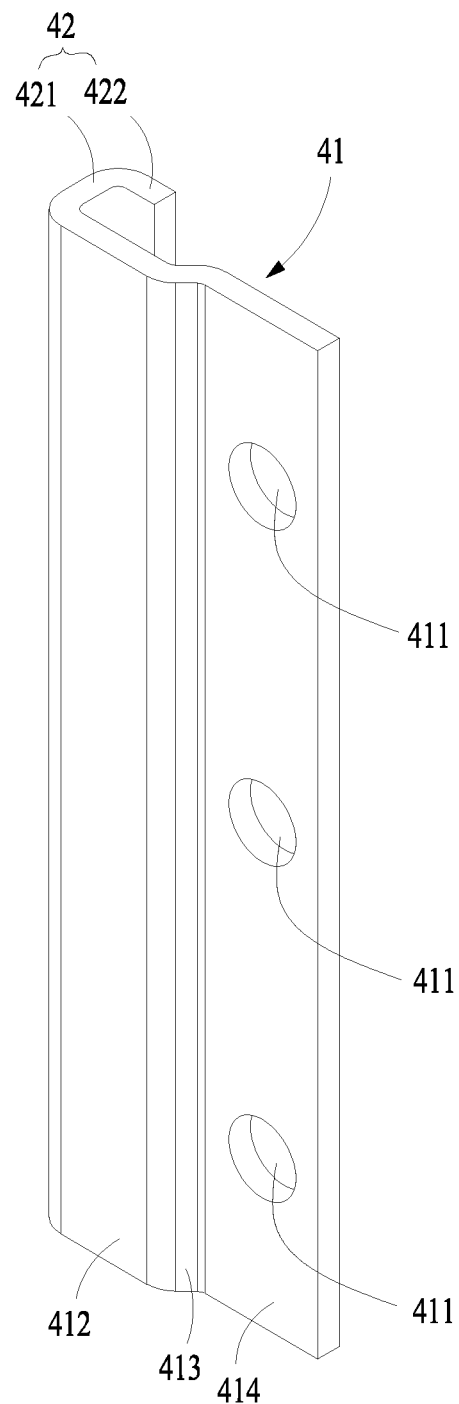
FIG. 6 is a schematic view showing the structure of a rigid connecting plate according to an embodiment of the present invention.

FIG. 1 schematically shows the structure of the battery module to which the composite end plate 1 of the present embodiment is applied. FIG. 2 schematically shows the structure of the fixing frame formed by connecting the composite end plate 1 of the present embodiment with the side plate 2. FIG. 3 schematically shows the exploded structure of the composite end plate 1 of the present embodiment. FIG. 4 schematically shows the structure of the composite end plate 1 of the present embodiment. FIG. 5 schematically shows a cross-sectional view taken along line A-A of FIG. 4. FIG. 6 schematically shows the structure of the rigid connecting plate 4 of the present embodiment.

As shown in FIG. 1 and FIG. 2, the composite end plate 1 of the embodiment of the present disclosure is used in a battery module. The battery module of this embodiment includes a plurality of batteries 99 arranged in one direction, two composite end plates 1 of the embodiment of the present disclosure, and two side plates 2. The plurality of batteries 99 form an assembly. The two composite end plates 1 are respectively disposed on opposite sides of the assembly in the direction in which the batteries 99 are arranged. The two side plates 2 are respectively spaced apart in a direction perpendicular to the direction in which the batteries 99 are arranged, and are respectively connected with the two composite end plates 1. The two composite end plates 1 and the two side plates 2 together form a fixing frame for fixing the plurality of batteries 99.

As shown in FIG. 3, the composite end plate 1 of the embodiment of the present disclosure includes a rigid substrate 3 and a rigid connecting plate 4.

The rigid substrate 3 has a predetermined length, a predetermined height, and a predetermined thickness, which can be arbitrarily selected as needed. The rigid substrate 3 has a first surface 3a and a second surface 3b, which are opposed in the thickness direction X of the rigid substrate 3. When the composite end plate 1 is used in a battery module, the first surface 3a of the composite end plate 1 may be disposed facing the battery 99. The first surface 3a is generally flat to fit the outer surface of the battery 99 having a square structure, thereby avoiding squeezing the case of the battery 99. The second surface 3b of the rigid substrate 3 is disposed facing away from the battery 99 toward the external environment.

The rigid connecting plate 4 of the present embodiment includes a connecting portion 41 and a hook portions 42 that are successively distributed, wherein the hook portion 42 is bent toward the connecting portion 41. The hook portion 42 is embedded in the rigid substrate 3, such that the rigid connecting plate 4 is accurately positioned on the rigid substrate 3 and the rigid connecting plate 4 is less likely to fall off from the rigid substrate 3. The connecting portion 41 is connected to the rigid substrate 3 to connect and fix the rigid connecting plate 4 to the rigid substrate 3. The connecting portion 41 is located on the second surface 3b for connecting and fixing with the external structural member. The material of the rigid connecting plate 4 is different from that of the rigid substrate 3. Alternatively, both the rigid substrate 3 and the rigid connecting plate 4 are made of metal, or the rigid substrate 3 is made of non-metal, and the rigid connecting plate 4 is made of metal.

In one embodiment, the side plate 2 of the battery module may be connected and fixed to the connecting portion 41 of the rigid connecting plate 4. When the batteries 99 are inflated and deformed, the side plate 2 applies tensile stress to the connecting portion 41. Since the hook portion 42 of the rigid connecting plate 4 is embedded in the rigid substrate 3, the rigid connecting plate 4 can withstand the tensile stress from the side plate 2. Since the hook portion 42 is firmly connected to the rigid substrate 3, it can prevent movement of the connecting portion 41 along the length direction Y of the rigid substrate 3 due to the tensile stress. Alternatively, both the side plate 2 and the rigid connecting plate 4 are made of steel, such that the both may be connected and fixed by welding. Therefore, the connection is simple and easy to operate. After the side plate 2 and the rigid connecting plate 4, which are both made of steel, are welded to each other, the connection between the both has strong strength, and thus, a greater stress can be withstood, and the following situation can be avoided: the inflation deformation force generated when the batteries 99 are expanded and deformed easily breaks the connection between the side plate 2 and the rigid connecting plate 4. Thus, the welding bead between the side plate 2 and the rigid connecting plate 4 has strong strength and accordingly has improved tensile stress resistance. Therefore, the composite end plate 1 can withstand larger inflation deformation force of the batteries 99, can improve the overall structure of the battery module, and can prevent change in shape of the battery module caused by the inflation deformation of the batteries 99. It can be understood, the side plate 2 and the rigid connecting plate 4 may also be made of other identical metal materials that meet the connection strength requirements.

When the composite end plate 1 of the embodiment of the present disclosure is applied into a battery module, the rigid substrate 3 of the composite end plate 1 of the present embodiment and the batteries 99 are disposed adjacent to each other, and the rigid connecting plate 4 is connected and fixed to the side plate 2. In the present embodiment, the number of the rigid connecting plate 4 disposed on the rigid substrate 3 may be one. The two side plates 2 are respectively fixedly connected to the rigid connecting plate 4. The two side plates 2 may simultaneously strain the rigid connecting plate 4, and transmit the straining force to the batteries 99 through the rigid substrate 3, so as to counteract the inflation deformation force of the batteries 99. The number of rigid connecting plates 4 disposed on the rigid substrate 3 may also be two. The two rigid connecting plates 4 are spaced apart along the length direction Y of the rigid substrate 3. One side plate 2 is fixedly connected to one rigid connecting plate 4, and the other side plate 2 is fixedly connected to the other rigid connecting plate 4.

In one embodiment, the number of rigid connecting plates 4 disposed on the rigid substrate 3 is two. The respective hook portions 42 of the two rigid connecting plates 4 are oppositely disposed. When the two rigid connecting plates 4 are subjected to tensile stress, the movement trends of the two hook portions 42 are reversed such that the rigid substrate 3 as a whole is uniformly stressed. Further, the two rigid connecting plates 4 are symmetrically disposed with respect to the central axis of the rigid substrate 3. This central axis extends in the height direction Z of the rigid substrate 3. The forces which are applied by the two rigid connecting plates 4 to the rigid substrate 3 are in an equilibrium state, avoiding rotation of the rigid substrate 3 around its central axis when the rigid substrate 3 is so stressed that the rotational torque generated on one side in the length direction Y is greater than the rotational torque generated on the other side, and further improving the positional stability of the rigid substrate 3.

Alternatively, when the number of the rigid connecting plates 4 disposed on the rigid substrate 3 is two, the rigid substrate 3 has a convex portion that protrudes from the second surface 3b. The convex portion is disposed between the two rigid connecting plates 4. When the side plate 2 and the rigid connecting plate 4 are fixedly connected, the surface of the side plate 2 facing away from the rigid substrate 3 is flush with the top end surface of the convex portion, so as not to affect the overall size of the battery module.

When at least one of the plurality of batteries 99 is inflated and deformed, the inflation deformation force is transmitted to the rigid connecting plate 4 and the side plate 2. The battery module can ensure the stability of its overall structure using fixed connection between the rigid connecting plate 4 and the side plate 2. When the battery 99 is inflated to generate an inflation deformation force, the two side plates 2 may apply a straining force to the rigid connecting plate 4 along the length direction Y of the rigid substrate 3, such that the rigid substrate 3 as a whole applies a compressive stress to the batteries 99 to counteract the inflation deformation force of the batteries 99, thereby preventing the composite end plate 1 from moving or deforming toward the direction away from the batteries 99.

Since the rigid substrate 3 mainly withstands tensile stress from the side plate 2, selection of the material of the rigid substrate 3 is more arbitrarily. In one embodiment, both the rigid connecting plate 4 and the side plate 2 are made of steel. Preferably, both the side plate 2 and the rigid connecting plate 4 are made of stainless steel, so they have high connection strength and good corrosion resistance. Under the premise that the connection rigidity between the side plate 2 and the rigid connecting plate 4 made of the same material satisfies the requirements, the density of the rigid substrate 3 may be smaller than the density of the rigid connecting plate 4. Alternatively, the rigid substrate 3 may be made of engineering plastic, fiberglass, carbon fiber, or the like, such that the overall weight of the composite end plate 1 can be reduced. Alternatively, the rigid substrate 3 may also be made of aluminum or aluminum alloy, such that the composite end plate 1 is easily processed by extrusion molding and machining.

The hook portion 42 of the rigid connecting plate 4 of the embodiment of the present disclosure may be non-detachably connected with the rigid substrate 3. For example, when the rigid substrate 3 is made of engineering plastic, the hook portion 42 may be directly embedded in the rigid substrate 3 by injection molding. When the rigid substrate 3 is made of aluminum, the hook portion 42 may be directly embedded in the rigid substrate 3 by die casting.

The hook portion 42 of the rigid connecting plate 4 of the embodiment of the present disclosure may also be detachably connected with the rigid substrate 3. This facilitates separate process and manufacture of the rigid connecting plate 4 and the rigid substrate 3 and subsequent assembling, and also facilitates replacement or maintenance of the rigid connecting plate 4.

As shown in FIG. 4 and FIG. 5, the connecting portion 41 of the embodiment of the present disclosure is fixedly connected to the rigid substrate 3 by a fastener 5. Therefore, connection strength between the rigid connecting plate 4 and the rigid substrate 3 is further improved, and separation of the rigid connecting plate 4 from the rigid substrate 3 due to connection failure between the rigid connecting plate 4 and the rigid substrate 3 is avoided.

In one embodiment, a through hole 31 extending in the thickness direction X of the rigid substrate 3 is provided in the rigid substrate 3. A connection hole 411 corresponding to the through hole 31 is provided in the connecting portion 41. The fastener 5 includes two opposite ends. The fastener 5 passes through the connecting hole 411 and the through hole 31, and one end thereof is connected to the connecting portion 41, and the other end thereof is connected to the rigid substrate 3, so as to form an integral composite end plate 1 by connecting the connecting portion 41 with the rigid substrate 3. The through hole 31 may be a stepped hole such that one end of the fastener 5 connected to the rigid substrate 3 is located in the through hole 31, thereby preventing the fastener 5 from protruding from the first surface 3a against the case of the battery 99. Alternatively, the fastener 5 may be a screw, and the through hole 31 is a threaded hole, and one end of the screw passes through the connection hole 411 and connects to the through hole 31 by screwing. The fastener 5 may also be a rivet such that the rigid connecting plate 4 and the rigid substrate 3 are riveted. The rivet may be a pulling rivet, which causes the connection process convenient and fast.

In one embodiment, the rigid substrate 3 includes a positioning groove 32 that is shaped to match the hook portion 42. The positioning groove 32 extends in the height direction Z of the rigid substrate 3, and penetrates the top end surface and the bottom end surface of the rigid substrate 3. The hook portion 42 may be inserted into the positioning groove 32 along the height direction Z. The positioning groove 32 includes an opening disposed in the second surface 3b. The positioning groove 32 can accurately position the rigid connecting plate 4 to connect and fix the rigid connecting plate 4 with the rigid substrate 3. When the hook portion 42 is inserted into the predetermined position, the connecting portion 41 and the rigid substrate 3 are connected and fixed by using the fastener 5.

The rigid substrate 3 of the embodiment of the present disclosure further includes a receiving groove 33 that is shaped to match the connecting portion 41. The receiving groove 33 is recessed from the second surface 3b toward the first surface 3a and communicates with the positioning groove 32. The receiving groove 33 extends in the height direction Z of the rigid substrate 3, and penetrates the top end surface and the bottom end surface of the rigid substrate 3. The connecting portion 41 is recessed into the receiving groove 33 such that a portion of the surface of the connecting portion 41 facing away from the rigid substrate 3 is flush with the second surface 3b. The free end of the connecting portion 41 may be pressed against the side wall of the receiving groove 33. In such case, when the side plate 2 applies a straining force to the connecting portion 41 along the length direction Y of the rigid substrate 3, the side wall may apply a resistance against the straining force onto the connecting portion 41 to counteract the straining force, thereby preventing the connecting portion 41 from moving along the length direction Y of the rigid substrate 3. One end of the side plate 2 is folded toward the second surface 3b of the rigid substrate 3 and is fixedly connected to the connecting portion 41 of the rigid connecting plate 4. The side plate 2 may simultaneously contact the second surface 3b and the surface of the connecting portion 41 facing away from the rigid substrate 3, thereby avoiding a gap between the side plate 2 and the second surface 3b, and increasing the force receiving area between the side plate 2 and the rigid substrate 3 such that the rigid substrate 3 is stressed more uniformly.

As shown in FIG. 6, the hook portion 42 of the embodiment of the present disclosure includes a first extending segment 421 and a second extending segment 422 which are disposed to intersect with each other. The hook portion 42 is connected to the connecting portion 41 by the first extending segment 421. The second extending segment 422 and the connecting portion 41 are located on the same side of the first extending segment 421. The first extending segment 421 of the hook portion 42 extends in the thickness direction X of the rigid substrate 3, and mainly withstands stress in the length direction Y of the rigid substrate 3, for example, the tensile stress transmitted from the side plate 2 to the rigid connecting plate 4. The second extending segment 422 of the hook portion 42 extends in the length direction Y of the rigid substrate 3, and mainly withstands the stress in the thickness direction X of the rigid substrate 3. Thus, the rigid connecting plate 4 can simultaneously withstand the urging forces in the length direction Y and the thickness direction X of the rigid substrate 3. Therefore, the rigid connecting plate 4 has stronger load capacity and good positional stability. Alternatively, the first extending segment 421 is perpendicular to the connecting portion 41, and the first extending segment 421 is perpendicular to the second extending segment 422.

When the hook portion 42 and the rigid substrate 3 are detachably connected, the positioning groove 32 disposed in the rigid substrate 3 correspondingly includes a first groove body which is shaped to match the first extending segment 421 and a second groove body which is shaped to match the second extending segment 422. The first groove body extends in the thickness direction X of the rigid substrate 3. The second groove body extends in the length direction Y of the rigid substrate 3 and communicates with the first groove body.

The connecting portion 41 of the embodiment of the present disclosure has a stepped structure, and includes a first straight segment 412, an intermediate transition segment 413, and a second straight segment 414 that are successively arranged. The intermediate transition segment 413 is disposed to intersect with the first straight segment 412. The second straight segment 414 is disposed in parallel with the first straight segment 412 and is connected to the intermediate transition segment 413. The connecting portion 41 is connected to the hook portion 42 by the first straight segment 412, and the connecting portion 41 is fixedly connected to the rigid substrate 3 by the second straight segment 414. Accordingly, the receiving groove 33 has a stepped structure. The receiving groove 33 includes a first groove section and a second groove section which are arranged along the length direction Y of the rigid substrate 3. The depth of the second groove section is greater than that of the first groove section. The first straight segment 412 of the connecting portion 41 is recessed into the first groove section and the second straight segment 414 is recessed into the second groove section. The surface of the first straight segment 412 facing away from the rigid substrate 3 is flush with the second surface 3b. The surface of the second straight segment 414 facing away from the rigid substrate 3 is spaced apart from the second surface 3b by a predetermined distance, and thereby leaving a gap between the side plate 2 and the second straight segment 414. When the connecting portion 41 is fixedly connected to the rigid substrate 3 by using the fastener 5, the gap is used for receiving the end portion of the fastener 5 protruding from the connecting portion 41, and thereby preventing the end portion from protruding from the second surface 3b to be pressed against the side plate 2 to deform the side plate 2.

The composite end plate 1 of the embodiment of the present disclosure comprises a rigid substrate 3 and a rigid connecting plate 4 which are made of different materials.

When the composite end plate 1 is applied into a battery module, the rigid connecting plate 4 is used for connecting and fixing with the side plate 2. The rigid connecting plate 4 and the side plate 2 may be of the same material and can be connected to each other by welding. Thus, the welding bead of the rigid connecting plate 4 and the side plate 2 has strong strength and improved tensile stress resistance, such that the composite end plate 1 can withstand larger inflation deformation force of the batteries 99. Therefore, the overall structure of the battery module is improved. In addition, the material of the rigid substrate 3 may be arbitrarily selected according to actual production requirements, which improves the adaptability of rigid substrate 3.

The embodiment of the present disclosure further provides a battery module comprising a plurality of batteries 99 and a fixing frame. The plurality of batteries 99 are arranged side by side in one direction. The fixing frame is disposed around the periphery of all the batteries 99 to fix the plurality of batteries 99. The fixing frame comprises two side plates 2 and two composite end plates 1 of the above-described embodiment. The plurality of batteries 99 form an assembly. The assembly is provided with one composite end plate 1 on each of the two opposite sides in the direction in which the battery 99 are arranged. The assembly is provided with one side plate 2 on each of the two opposite sides in the direction perpendicular to the direction in which the battery 99 are arranged. The composite end plates 1 and the side plates 2 are alternately disposed around all the batteries 99. The material of the side plate 2 is same as that of the rigid connecting plate 4. The two rigid connecting plates 4 disposed on two sides of the plurality of batteries 99 are connected by the two side plates 2. Alternatively, each of the side plates 2 has a U-shaped structure, and both ends of each side plate 2 are folded over to the second surface 3b side of the rigid substrate 3, and are connected and fixed to the connecting portion 41 of the rigid connecting plate 4.

In one embodiment, both the side plate 2 and the rigid plate 4 are made of steel. Preferably, both the side plate 2 and the rigid connecting plate 4 are made of stainless steel. In such case, the rigid connecting plate 4 and the side plate 2 can be connected and fixed by welding, and the welding bead formed by the rigid connecting plate 4 and the side plate 2 has strong strength. Therefore, the composite end plate 1 can withstand the larger inflation deformation force generated by inflation of the batteries 99, can effectively reduce the amount of movement or deformation of the composite end plate 1 in the direction away from the batteries 99, and can improve the overall structural reliability of the battery module.

The composite end plate 1 is provided with two mounting holes extending in the height direction Z of the rigid substrate 3. The two mounting holes are spaced apart along the length direction Y of the rigid substrate 3. With the screws passing through the mounting holes provided in the composite end plate 1, the battery module is fixedly connected to the external structural member such as the box by screwing. Therefore, the battery module can be quickly and reliably connected to the external structural member.

Although the present disclosure has been described with reference to the above preferred embodiments, various modifications may be made thereto and the components therein may be replaced with equivalents without departing from the scope of the present disclosure. In particular, each technical feature mentioned in the various embodiments may be combined in any manner as long as there is no structural conflict. The present disclosure is not limited to the specific embodiments disclosed herein, but includes all technical solutions falling within the scope of the claims.

REFERENCE NUMERALS 1 composite end plate
2 side plate
3 rigid substrate
3a first surface
3b second surface
31 through hole
32 positioning groove
33 receiving groove
4 rigid connecting plate
41 connecting portion
411 connecting hole
412 first straight segment
413 intermediate transition segment
414 second straight segment
42 hook portion
421 first extending segment
422 second extending segment
5 fastener
99 battery
X thickness direction
Y length direction
Z height direction

What is claimed is:

1. A composite end plate for a battery module, comprising:
   a rigid substrate, which has a first surface and a second surface that are opposite in a thickness direction of the rigid substrate, the first surface is disposed facing batteries; and
   a rigid connecting plate, which comprises a connecting portion and a hook portion that is bent toward the connecting portion, the hook portion is embedded in the rigid substrate to connect the rigid connecting plate to the rigid substrate, the connecting portion is located on the second surface for connecting and fixing with an external structural member, and a material of the rigid connecting plate is different from that of the rigid substrate,
   wherein the hook portion includes a first extending segment extending in the thickness direction of the rigid substrate and a second extending segment extending in a length direction of the rigid substrate, and the hook portion is connected to the connecting portion by the first extending segment, and the second extending segment and the connecting portion are both located on a side of the first extending segment facing away from a central axis, in the length direction, of the rigid substrate.

2. The composite end plate according to claim 1, wherein, the rigid substrate and the rigid connecting plate are both made of metal; or
   the rigid substrate is made of non-metal, and the rigid connecting plate is made of metal.

3. The composite end plate according to claim 1, wherein, the connecting portion is fixedly connected to the rigid substrate by a fastener, a through hole extending in the thickness direction is provided in the rigid substrate, a connecting hole corresponding to the through hole is provided in the connecting portion, and the fastener passes through the connecting hole and the through hole to connect and fix the connecting portion with the rigid substrate.

4. The composite end plate according to claim 1, wherein the number of the rigid connecting plate is two, and the two rigid connecting plates are spaced apart in a length direction of the rigid substrate.

5. The composite end plate according to claim 4, wherein the hook portions of the two rigid connecting plates are oppositely disposed, and the two rigid connecting plates are symmetrically disposed with respect to the central axis of the rigid substrate.

6. The composite end plate according to claim 1, wherein the rigid substrate includes a positioning groove which is shaped to match the hook portion, the positioning groove extends in a height direction of the rigid substrate, and the hook portion can be inserted into the positioning groove along the height direction.

7. The composite end plate according to claim 6, wherein the rigid substrate further comprises a receiving groove which is shaped to match the connecting portion, the receiving groove is recessed from the second surface toward the first surface and is communicated with the positioning groove, the connecting portion is recessed into the receiving groove, and a surface of the connecting portion facing away from the rigid substrate is flush with the second surface.

8. The composite end plate according to claim 1, wherein the connecting portion includes a first straight segment, an intermediate transition segment, and a second straight segment that are successively arranged, the intermediate transition segment is disposed to intersect the first straight segment, the second straight segment is disposed in parallel with the first straight segment and is connected to the intermediate transition segment, the connecting portion is connected to the hook portion by the first straight segment, and the connecting portion is fixedly connected to the rigid substrate by the second straight segment.

9. A battery module, comprising:
a plurality of batteries, which are arranged side by side; and
a fixing frame, which is disposed around an periphery of all the batteries, the fixing frame comprises two composite end plates according to claim 1 and two side plates, the composite end plates and the side plates are alternately disposed around the plurality of the batteries, and the side plates are made of the same material as the rigid connecting plates and are fixedly connected to the connecting portions.

* * * * *